United States Patent [19]

Appleyard et al.

[11] Patent Number: 4,804,429
[45] Date of Patent: Feb. 14, 1989

[54] METHOD OF FORMING A FLOOR TILE ON A DRUM

[75] Inventors: F. Joseph Appleyard, East Petersburg; William L. Mason, Willow Street; John H. Young, Lancaster, all of Pa.

[73] Assignee: Armstrong World Industries, Inc., Lancaster, Pa.

[21] Appl. No.: 131,582

[22] Filed: Dec. 11, 1987

[51] Int. Cl.$^4$ .............................................. B32B 31/00
[52] U.S. Cl. ..................................... 156/209; 156/282; 156/324; 156/555
[58] Field of Search ............... 156/220, 209, 324, 555, 156/498, 282, 582; 264/171

[56] References Cited

U.S. PATENT DOCUMENTS

| | | | |
|---|---|---|---|
| 3,150,031 | 9/1964 | Powell | 156/209 |
| 4,312,686 | 1/1982 | Smith et al. | 156/209 |
| 4,612,074 | 9/1986 | Smith et al. | 156/85 |
| 4,678,528 | 7/1987 | Smith et al. | 156/220 |

FOREIGN PATENT DOCUMENTS 48002 2/1980 Japan .................................. 156/324

*Primary Examiner*—Michael W. Ball
*Assistant Examiner*—Michele Davison

[57] ABSTRACT

A large drum receives a heated sheet of vinyl mixture. While on the drum, the sheet has laminated thereto a rigid vinyl film and the surface of the sheet with the vinyl film is embossed. The film/sheet composite is cooled and removed from the drum.

6 Claims, 1 Drawing Sheet

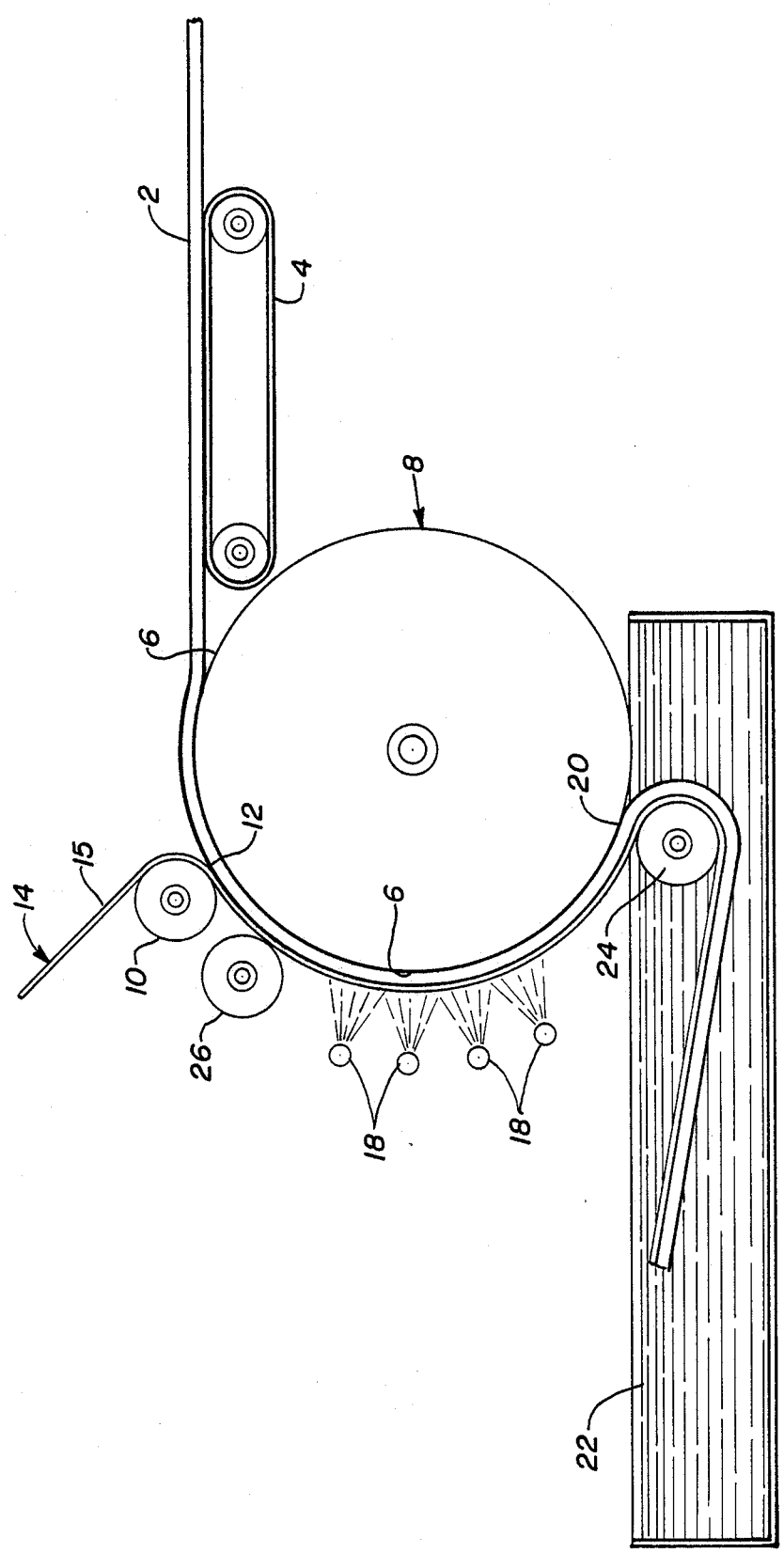

METHOD OF FORMING A FLOOR TILE ON A DRUM

BACKGROUND OF THE INVENTION

1. Field of the Invention

The invention is directed to the making of a floor tile product and, particularly, the forming of the product on a large drum.

2. Description of the Prior Art

U.S. Pat. Nos. 4,312,686, 4,612,074, and 4,678,528 disclose a method and apparatus for making a printed and embossed floor covering. Particularly, in U.S. Pat. No. 4,312,686, a hot plastic material is applied to a belt and is maintained at a temperature which will cause it to adhere or stick to the belt. The belt moves the plastic material through printing, laminating, and embossing steps and heaters are used throughout this process to heat both the belt and the plastic to ensure that the plastic continues to adhere to the belt. At the laminating station, a vinyl film is laminated over the printed plastic material adhered to the belt and the lamination is subsequently embossed. After embossing, the laminate is cooled so that it can be stripped from the belt. The cooling is accomplished by a water spray directed against the upper surface of the laminate. A second water spray will cool the belt.

SUMMARY OF THE INVENTION

The invention herein is directed towards the method of making a sheet material which will be formed into a floor tile product. A vinyl mixture sheet is provided on a first conveyor at a temperature of 300° F. to 340° F. The sheet is transferred from the first conveyor to the surface of the upper portion of a drum. The one surface of the sheet engages the drum surface and the drum surface is maintained at a temperature of 180° F., plus or minus 30° F., or an appropriate "stick range" for good adherence of the sheet to the drum surface. After the sheet is positioned on the drum, the outer surface of the sheet is engaged by a roll which may emboss a pattern on the surface of the sheet. The roll may be a laminating and embossing roll and both these steps are carried out at one time. It is possible that two rolls could be used—the first roll being a laminating roll and the second roll being an embossing roll. When the roll(s) and the drum engages the sheet material at the nip thereof, the sheet is adhered well to the drum surface and will pass through the nip. A rigid vinyl film can also pass through the nip with the sheet. The film and sheet are laminated together with the heat of the sheet raising the temperature of the vinyl film above the glass transition temperature of the film. The embossing may be carried out during the lamination step or as a separate step. The film/sheet composite then moves down the surface of the drum towards the bottom of the drum. Cooling water is sprayed primarily on the vinyl film to cool the vinyl film side of the composite to 150° F. or a temperature that is below the glass transition temperature of the vinyl film, without substantially cooling the drum surface. Near the bottom of the drum, the film/sheet composite is removed from the drum at a point where the adherence of the composite to the drum surface has diminished to permit easy release of the sheet from the drum surface and the movement of the film/sheet composite away from the drum.

The vinyl mixture sheet is composed of at least a vinyl resin, a plasticizer and filler to form a floor tile material at least 42 mils thick. The vinyl film is a rigid vinyl film at least 2 mils thick and may have a design printed on the surface of the film that engages the sheet. The vinyl film is a rigid vinyl film because it has a plasticizer level of 0 to 3%. Both the vinyl mixture sheet and the rigid vinyl film are blended and processed such that both have substantially the same degree of shrinkage.

Brief Description of the Drawing

The figure of the drawing a schematic showing of the drum structure invention herein.

DETAILED DESCRIPTION OF THE INVENTION

The method herein is used for making a sheet material which will be a tile base product with a decorative rigid film on one surface therein and the surface containing the rigid vinyl film having an embossed effect. The basic vinyl mixture sheet 2 is provided on a first conveyor 4 at a temperature of 300° F. to 340° F. The vinyl mixture sheet is composed of at least a vinyl resin, plasticizer, and filler to form a floor tile material at least 42 mils thick. The vinyl mixture sheet is conventional in the art and is typical of the vinyl compounds used to form conventional floor tile. The sheet 2 is transferred from the first conveyor 4 to the surface of the upper portion of a large drum 8. One surface of the sheet engages the drum surface 6 at about the one o'clock position of the drum. The drum surface is maintained at a temperature of 180° F., plus or minus 30° F., due to passage of cooling water/temperature controlled through the interior of the drum. The temperature of the drum is what is referred to as an appropriate "stick range" for good adherence of the sheet to the drum surface. Vinyl compound will tend to stick to a heated surface and will not shift relative to the heated surface when some type of processing step is performed on the vinyl. If the temperature is too low, there will be movement of the vinVl relative to the surface that it is carried on when some type of operation is performed on the vinyl, for example, an embossing step. Naturally, if the temperature is too high, the vinyl becomes very fluid and cannot be operated on by a conventional step for modifying the tile surface, for example, an embossing step.

Shortly after the sheet is postioned on the drum surface, it is engaged indirectly by at least one roll and possibly two rolls. The roll will not directly engage the sheet because a rigid vinyl film with a printed design on surface 15 is inserted between the roll and the exposed surface of the vinyl mixture sheet on the surface of the drum. The drum and the roll form a nip or space therebetween. Through this space passes the vinyl mixture sheet and the rigid vinyl film. In the nip, the sheet and the film are laminated together. It is possible that a single roll may be used and that a lamination and embossing step carried out by the one roll. It is also possible that two rolls can be used wherein lamination would be carried out by a roll 10 laminating sheet 14 to the upper surface of the vinyl mixture sheet 2 at the nip 12 between roll 10 and drum 8. A second roll 26 would provide an embossed effect to the surface of the vinyl mixture sheet containing the rigid vinyl flim. At the nip 12 there is really formed a film/sheet composite. At the time the sheet passes between the nip between the roll 10 or 26 and the drum, the sheet is adhering well to the drum surface and passes through the nip without any relative movement of the vinyl sheet material with regard to the drum surface. The film and sheet are laminated together with the heat of the sheet raising the temperature of the vinyl film above the glass transition temperature of the film. The glass transition temperature of the film is the temperature above which the film is stressed free and may be altered, i.e. laminated and/or embossed, without developing stresses in the film. At this point embossing of the film/sheet composite is carried out to provide an embossed pattern in the surface of the film/sheet composite containing the rigid vinyl film. The rigid vinyl film is called a "rigid" film because it has a plasticizer level of 0 to 3%. The rigid vinyl film is any conventional vinyl film being approximately 3 mils thick and the vinyl mixture sheet is approximately 42 mils thick.

The film/sheet composite now moves counterclockwise down the surface of the drum. The laminating and embossing are carried out about the 11-12 o'clock position on the drum. The film/sheet composite now moves from the 11 o'clock position down to approximately the 7 o'clock position on the drum. While the film/sheet composite is moving downward along the surface of the drum, there is sprayed/poured cooling water 18 primarily on the surface of the film/sheet composite having the rigid vinyl film fastened thereto. This cools the vinyl film side of the composite to about 150° F. or a temperature that is below the glass transition temperature of the vinyl film. The cooling of the film surface is carried out without substantially cooling the drum surface. By moving down below the glass transition temperature of the vinyl film, the vinyl film will now have an embossed pattern which it will retain and generally no embossing stresses exist in the vinyl film. What stresses developed during processing due to heat or handling of the composite will be locked in when the composite leaves the drum. This provides a flat product that will stay flat in use on the floor.

Near the bottom of the large drum, which is approximately six feet in diameter, the film/sheet composite is removed from the drum because the adherence of the sheet to the drum surface has diminished to permit easy release of the sheet from the drum surface. The film/sheet composite passes around roll 24 and falls into a water bath 22 as it leaves the drum surface 8 to keep the film below its glass transition temperature.

What is claimed is:

1. A method of making a sheet material comprising:
   (a) placing a vinyl mixture sheet on a first conveyor at a temperature of 300° F., to 340° F.,
   (b) transferring the sheet from the first conveyor to the surface of the upper portion of a large drum, one surface of said sheet engaging said drum surface and said drum surface being maintained at a temperature of 180° F., plus or minus 30° F., for good adherence of the sheet to the drum surface;
   (c) shortly after the sheet is positioned on the drum surface, engaging indirectly the second surface of said sheet with a least one roll;
   (d) said one roll and said drum forming a nip therebetween, said sheet at this point at least adhering well to the drum surface and passing through said nip, a rigid vinyl film also passing through the nip with said sheet, and said film and sheet being laminated together with the heat of the sheet raising the temperature of the vinyl film above the glass transition temperature of the film and embossing the film/sheet composite with a pattern;
   (e) then moving the film/sheet composite down the downward moving surface of the drum and spraying cooling water primarily on the rigid vinyl film now fastened to the sheet carried on the drum to cool the vinyl film side of the composite to a temperature that is below the glass transition temperature of the vinyl film, without substantially cooling the drum surface, and
   (f) near the bottom of the large drum, removing the film/sheet composite from the drum where adherance of the sheet to the drum surface has diminshed to permit easy release of the sheet from the drum surface.

2. The method of claim 1 wherein the vinyl mixture sheet is composed of at least vinyl resin, plasticizer and filler to form a floor tile material at least 42 mils thick.

3. The method of claim 2 wherein the rigid vinvl film is at least 2 mils thick, has a design printed on the surface that engages the sheet, and has a plasticizer level of 0 to 3%.

4. The method of claim 3 wherein the vinyl mixture sheet and the rigid vinyl film are blended and processed such that both have substantially the same degree of shrinkage.

5. The method of claim 1 wherein the laminating and embossing steps are carried out at the same time by said one roll.

6. The method of cIaim 1 wherein the laminating step is carried out by said one roll and the embossing step is carried out thereafter by a separate second roll.

* * * * *